2,808,405
ACYLATED AMINO ACID ESTERS OF DEXTRAN PRODUCTS AND METHOD OF MAKING SAME

Leo J. Novak and Alfred E. Bishop, Dayton, Ohio, assignors to The Commonwealth Engineering Company of Ohio, Dayton, Ohio, a corporation of Ohio No Drawing. Application March 11, 1955,
Serial No. 493,817

15 Claims. (Cl. 260—234)

This invention relates to a new class of dextran products containing basic nitrogen, and to methods of preparing them.

The presence of basic nitrogen in the dextran molecule imparts to the products an affinity for the acid wool dyes and the products are of considerable interest for various purposes including the production of shaped or molded articles which can be dyed to deep shade.

One object of this invention is to provide a new class of dextran products.

A further object is to provide dextran products containing basic nitrogen and susceptible of being dyed with acid wool-type dyes.

An additional object is to provide a method for preparing the new dextran products using acylated amino acids.

Other objects and advantages of the invention will appear hereinafter.

In accordance with the invention, an acylated amino acid, i. e. an amino acid containing at least one acyl group on the nitrogen atom of the acid, is reacted with a high molecular weight dextran or with carboxymethyl dextran containing an average of 0.5 to 1.5 carboxymethyl groups per anhydroglucose units, in a non-aqueous system and in the presence of an impelling anhydride and an esterification catalyst.

The dextrans are usually obtained by incubating a sucrose-containing nutrient medium inoculated with a culture of a dextran-synthesizing microorganism (or with the enzyme filtered from the culture), until the dextran is biosynthesized in maximum yield. The product, native dextran, is then precipitated by alcohol, purified and dried. As obtained under the usual conventional conditions, the native dextran has a very high molecular weight calculated to be in the millions.

In one embodiment of this invention, the native high molecular weight dextran, preferably after reduction to finely divided form, is reacted with the acylated amino acid.

Microorganisms (or their enzymes) which may be used to convert the sucrose to dextran include those bearing the following NRRL (Northern Regional Research Laboratory) designations: *Leuconostoc mesenteroides* B–119, B–512, B–1146, B–1190, B–742, B–1191, B–1196, B–1208, B–1216, B–1120, B–1144, B–523, *Streptobacterium dextranicum* B–1254 and *Betabacterium vermiforme* B–1139.

In another embodiment, the dextran either in the native state or after partial hydrolysis to a dextran of lower molecular weight, such as a partial hydrolyzate having a molecular weight of 20,000 to 200,000, average 60,000 to 80,000, is converted to the carboxymethyl ether prior to reaction with the acylated amino acid.

The carboxymethyl dextran may be obtained by reacting the dextran, in aqueous solution or suspension, with a strong alkali metal hydroxide such as sodium or potassium hydroxide and an alkali metal chloracetate, such as sodium or potassium chloracetate. The reaction may be run at 50–100° C. for ten minutes to two hours, using a molar ratio of sodium or potassium chloracetate to dextran of 2:1 to 12:1, a molar ratio of sodium or potassium hydroxide to dextran of 5:1 to 15:1, and a molar ratio of water to dextran of 70:1 to 120:1. The conditions are selected so that the ether has the preferred D. S. of 0.5 to 1.5 carboxymethyl groups per A. G. U.

The initial reaction product is a viscous mass comprising the alkali metal salt of the ether. The salt may be precipitated with a water-miscible aliphatic alcohol or acetone, purified and reacted with the acylated amino acid. Or the solution of the salt may be acidified to a pH of 2.0–3.0, and the water-miscible aliphatic alcohol or ketone added to precipitate the ether.

The amino acid is one which has been acylated with an appropriate reagent to "block off" the most active of the amino acid hydrogen atoms. Any suitable method of acylating the amino acid may be employed. For example, the amino acid may be reacted with an acid halide such as acetyl chloride, or with an acid anhydride such as acetic anhydride. The acylation method is not critical except that the most active hydrogen of the amino group must be replaced by the acyl group. The acyl group of any organic acid which replaces the amino hydrogen and remains united with the amino acid during the esterification process is suitable.

The conditions of the esterification are critical, since the esterification must be carried out in an essentially anhydrous system.

We have found that when carboxymethyl dextran is reacted in aqueous medium with acetyl glycine (or other acylated amino acid) in the presence of monochloracetic anhydride and magnesium perchlorate as the catalyst, no reaction occurs between the acetyl glycine and dextran ether.

If pyridine is substituted for the water, a black, gummy reaction product is obtained. However, the mass is not and does not comprise a reaction product of the dextran ether and acylated amino acid.

On the other hand, it is found that if the reaction is carried out in toluene, an ester is obtained by chemical reaction between the carboxymethyl dextran and acetyl glycine or the like.

The same results are observed when native dextran is used as one reactant. In that case, also, the reaction takes place, with production of an ester, when toluene is used as the inert medium.

Using toluene, products are obtained having a nitrogen content varying on the average between about 0.4 and 2.2%.

The impeller may be a monohalogenated, specifically monochlorinated, acetic anhydride. Suitable catalysts include magnesium chloracetate, sulfuric acid, phosphoric acid, zinc chloride, and the like.

The products are N-acyl-alpha-amino acid esters of the dextran, the carboxymethyl dextran or the alkali metal salt of carboxymethyl dextran, which may be soluble in water but which are generally insoluble in common organic solvents including methyl and isopropyl alcohol, acetone, chloroform, ether, methyl acetate, benzene and toluene.

The following examples, in which parts are by weight unless otherwise stated, are illustrative of specific embodiments of the invention, it being understood that these examples are not limitative.

*Example 1*

About 12.1 parts of the sodium salt of a carboxymethyl ether of hydrolyzed (M. W. average about 70,000) dextran containing an average of 0.8–1.0 carboxymethyl group per A. G. U., 250 parts of toluene (by volume), 12.5 parts of acetyl glycine, 17.5 parts of monochloracetic anhydride and 0.2 part of magnesium perchlorate were placed in a vessel equipped with an agitator, and heated (with continued agitation) to 110° C. on the water bath. A slight vacuum was applied during the heating, which was continued for about four hours. About 130 parts of toluene and a trace of water were collected in the trap.

The hot reaction mass was poured onto 200 parts of ice. The vessel was washed out with 110 parts of water, and the wash liquid also poured on the ice.

The mass was then placed in a separatory funnel and the water and solids were separated from the residual toluene. The aqueous material, which was dark brown in color, was filtered to remove the undissolved solids. The residue was dried for two hours at 110° C.

The aqueous filtrate was adjusted to pH 7.0 by addition of sodium hydroxide, distilled under 10" vacuum at 100° C. for three hours. About 57 parts by volume of water were removed. The residual did not yield a precipitate when allowed to stand at 5° C. for 16 hours.

The solid product (ester) was slightly soluble in water, insoluble in methanol, acetone, chloroform, ether, isopropanol, methyl acetate, benzene and toluene. The Nessler's test for free N was negative. On quantitative analysis the combined nitrogen content of the N-acetyl-alpha-amino acid ester of the carboxymethyl dextran sodium salt was found to be 2.63%. The free carboxymethyl dextran ether, may be used instead of the salt, with substantially the same results.

*Example II*

The following ingredients were placed in the reaction vessel equipped with agitator:

10.0 parts particulate carboxymethyl ether of hydrolyzed L. m. B-512 dextran (M. W. average 70,000) containing an average of 2.0 carboxymethyl groups per A. G. U.
250 parts (by volume) toluene
120 parts acetyl glycine
16.7 parts monochloracetic anhydride
0.2 part magnesium perchlorate and heated at 110° C. for about three hours on the water bath.

The contents of the vessel were then poured onto 200 parts of ice, and the liquid resulting from washing out the vessel with 100 parts of water added. The mass was placed in a separatory funnel and the aqueous solution and solids separated from the toluene. The toluene was washed twice with 25 parts (total) of water, and the wash liquid, free from toluene, was added to the aqueous solution separated in the funnel, to provide a total volume of 360 parts of aqueous solution having a pH of 2.20. The pH was adjusted to 7.0, and the solution was refrigerated at 5° C. for 16 hours. At the end of the 16 hours, the pH of the solution was 6.65. It was again adjusted to pH 7.0, and the solids removed by centrifuging. The granular residue was light brown in color.

The pH of the liquid reaction media had dropped to 6.02.

The liquid was next washed with 125 parts of water and the solids separated by centrifuging.

The pH of the liquid was then 5.70. It was washed again, using 125 parts of methanol and centrifuged to separate the solids. The pH of the wash solution at this stage was 6.2.

Acetone (125 parts) was used as the final wash and the solids separated in the centrifuge.

The final solid product was dried for 2 hours at 65° C., under vacuum.

The nitrogen-containing carboxymethyl dextran ester, a straw-colored granular material, was somewhat soluble in water at ordinary temperature.

*Example III*

The following ingredients were placed in the reaction vessel equipped with stirrer:

12.1 parts native L. m. B-512 dextran
250 parts (by volume) toluene
12.5 parts acetyl glycine
12.5 parts monochloracetic anhydride
0.2 parts magnesium perchlorate and heated on the water bath, with refluxing, at 110° C. for five hours.

The reaction mixture was poured onto 200 parts of ice. The liquid obtained by washing out the vessel with 100 parts of water was added.

The residual toluene was removed by washing the mass with 50 parts by volume of water. The aqueous solution containing the solid ester had a pH of 2.10. The pH was adjusted to 7.0 using sodium hydroxide, and the solids were separated by centrifuging. Since the reaction product was lighter than water, the liquid phase separated to the bottom. The solids were washed with 100 parts by volume of water and collected as the upper phase under centrifuge. After successive washings with 100 parts by volume of methanol and 100 parts by volume of acetone, the product was dried under vacuum for 2 hours at 65° C.

The nitrogen-containing dextran ester was obtained as a substantially white powder. This ester is slightly soluble in water. When 0.5 gm. of the ester was added to 50 ml. of water, the pH was 3.0. The pH was adjusted to 12.25 with sodium hydroxide. The pH dropped toward the acid side but finally remained above 7.0 until solution was attained at 28° C.

A clear red solution resulted when 0.5 gm. of the ester in 50 ml. of water was adjusted to a pH of 12.25 with sodium hydroxide, and then adjusted to pH 1.5 by addition of hydrochloric acid. On neutralization to pH 7.5 with sodium hydroxide, the solution remained a clear red in color. On addition of 2 ml. of ferric chloride to the solution, the pH dropped to 4.1 and a red precipitate appeared. The precipitate re-dissolved on adjusting the pH to 6.6 by addition of sodium hydroxide and remained in solution when the pH was raised to 8.5 and then dropped to 1.0.

(A) A solution of 1.0 gm. of the ester in 50 ml. of water having a pH of 12.25 was adjusted to pH 7.7 by addition of hydrochloric acid and worked up as follows:

(a) 10 ml. of the solution were evaporated, a soft, adhesive resin being obtained;

(b) Another 10 ml. of the solution of pH 7.7 was separated, mixed with 3 ml. of formaldehyde, and evaporated, leaving a light brown gum;

(c) The remainder of solution (A) was adjusted to pH 6.9 by addition of hydrochloric acid, and 10 ml. thereof were separated and evaporated, the residue of the evaporation being a soft, adhesive resin;

(d) 3 ml. of formaldehyde were added to a further quantity (10 ml.) of the solution of pH 6.9, and the solution containing the formaldehyde was dried for 16 hours at 110° C. to yield a light brown gum.

The resins of (a) and (b) were readily soluble in water. The gums of (c) and (d) were more slowly soluble in water.

The addition of 10% of alum to the aqueous solutions caused coagulation of the gums and resins, and the coagulated products were only slightly soluble in water.

The native dextran or carboxymethyl dextran and acylated amino acid are used in substantially equal amounts by weight in the specific examples given but either may be used in slight excess. The toluene is used in an amount sufficient to provide a non-viscous solution of the reactants.

The conditions given are generally useful and may be followed for effecting reaction between other native high molecular weight dextrans or carboxymethyl ethers of the native or partially hydrolyzed dextrans and acylated amino acids of the formula

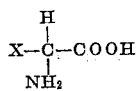

in which X represents the acyl group RCO—, R being an alkyl group of from 1 to 5 carbon atoms.

The carboxymethyl dextran may have a D. C. with respect to carboxymethyl groups of 0.5 to 2.0, but a low D. S. of 0.5–1.5 is preferred.

A reaction temperature of 75° C.–120° C. is generally useful. The reaction time may vary for the particular reactants but usually the reaction is complete in two to five hours.

Changes in the reaction conditions within the limits indicated and other modifications may be made in carrying out the method described. As these changes and modifications may be made within the scope of the disclosure it is to be understood that it is not intended to limit the invention except as defined in the appended claims.

What is claimed is:

1. An N-acyl-alpha-amino acid ester of a substance selected from the group consisting of native high molecular weight, microbiologically produced dextran, carboxymethyl dextran and alkali metal salts of carboxymethyl dextran, in which, in the acyl group RCO—, R is an alkyl radical of 1 to 5 carbon atoms.

2. An N-acyl-alpha-amino acid ester of native, high molecular weight, microbiologically produced dextran, in which, in the acyl group RCO—, R is an alkyl radical of 1 to 5 carbon atoms.

3. An N-acyl-alpha-amino acid ester of carboxymethyl dextran, in which, in the acyl group RCO—, R is an alkyla radical of 1 to 5 carbon atoms.

4. An N-acyl-alpha-amino acid ester of an alkali metal salt of carboxymethyl dextran, in which, in the acyl group RCO—, R is an alkyl radical of 1 to 5 carbon atoms.

5. An N-acetyl-alpha-amino acid ester of native high molecular weight, microbiologically produced dextran.

6. An N-acetyl-alpha-amino acid ester of carboxymethyl dextran.

7. An N-acetyl-alpha-amino acid ester of an alkali metal salt of carboxymethyl dextran.

8. The method of making N-acyl-alpha-amino acid esters of a dextran product selected from the group consisting of native high molecular weight, microbiologically produced dextran, carboxymethyl dextran, and alkali metal salts of carboxymethyl dextran, which comprises mixing the dextran product with an N-acyl-alpha-amino acid in which, in the acyl group RCO—, R is an alkyl group of 1 to 5 carbon atoms, an impelling monohalogenated monobasic acid and an esterification catalyst, in toluene, heating the mixture to a temperature of 75° C. to 110° C. until the esterification reaction is complete, and separating the ester from the reaction medium.

9. The method according to claim 8, characterized in that the dextran product is native, high molecular weight, microbiologically produced dextran.

10. The method according to claim 8, characterized in that the dextran product is carboxymethyl dextran.

11. The method according to claim 8, characterized in that the dextran product is an alkali metal salt of carboxymethyl dextran.

12. The method according to claim 8, characterized in that the acylated amino acid is acetyl glycine.

13. The method according to claim 9, characterized in that the acylated amino acid is acetyl glycine.

14. The method according to claim 10, characterized in that the acylated amino acid is acetyl glycine.

15. The method according to claim 11, characterized in that the acylated amino acid is acetyl glycine.

References Cited in the file of this patent

UNITED STATES PATENTS

| | | |
|---|---|---|
| 2,007,950 | Dreyfus | July 9, 1935 |
| 2,072,870 | Dreyfus | Mar. 9, 1937 |
| 2,538,903 | Gaver et al. | Jan. 23, 1951 |